United States Patent
Goncharov et al.

(10) Patent No.: US 10,839,832 B1
(45) Date of Patent: Nov. 17, 2020

(54) MAMR RECORDING HEAD WITH HIGH DAMPING TRAILING SHIELD SEED LAYER

(71) Applicant: Western Digital Technologies, Inc., San Jose, CA (US)

(72) Inventors: Alexander Goncharov, Morgan Hill, CA (US); Muhammad Asif Bashir, San Jose, CA (US); Petrus Antonius Van Der Heijden, Cupertino, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/730,713

(22) Filed: Dec. 30, 2019

(51) Int. Cl.
G11B 5/31 (2006.01)
G11B 5/127 (2006.01)
G11B 5/35 (2006.01)
G11B 5/11 (2006.01)
G11B 5/00 (2006.01)

(52) U.S. Cl.
CPC .......... *G11B 5/315* (2013.01); *G11B 5/11* (2013.01); *G11B 5/1278* (2013.01); *G11B 5/314* (2013.01); *G11B 5/3133* (2013.01); *G11B 5/3146* (2013.01); *G11B 5/3153* (2013.01); *G11B 5/35* (2013.01); *G11B 2005/0024* (2013.01)

(58) Field of Classification Search
None
See application file for complete search history.

(56) References Cited

U.S. PATENT DOCUMENTS

| 8,582,240 | B1* | 11/2013 | Chen | G11B 5/399 360/125.3 |
| 8,658,292 | B1 | 2/2014 | Mallary et al. | |
| 8,675,309 | B2* | 3/2014 | Braganca | G01R 33/093 331/94.1 |
| 8,842,387 | B1 | 9/2014 | Horde et al. | |
| 8,854,768 | B2 | 10/2014 | Sugiura et al. | |
| 9,099,115 | B2* | 8/2015 | Braganca | G11B 5/84 |
| 9,208,801 | B2 | 12/2015 | Zhang et al. | |

(Continued)

FOREIGN PATENT DOCUMENTS

WO 2015126326 A1 8/2015

OTHER PUBLICATIONS

Tagawa, Ikuya et al.; "Advantage of MAMR Read-Write Performance", IEEE Transactions on Magnetics, vol. 52, Issue 9, Sep. 2016 (4 pages).

(Continued)

*Primary Examiner* — William J Klimowicz
(74) *Attorney, Agent, or Firm* — Patterson & Sheridan, LLP; Steven H. Versteeg

(57) ABSTRACT

A microwave assisted magnetic recording (MAMR) write head includes a main pole and a trailing shield. A spin torque oscillator device is disposed between the main pole and the trailing shield. The spin torque oscillator device includes a free layer. A trailing shield hot seed layer is disposed between the spin torque oscillator device and the trailing shield. The trailing shield hot seed layer includes a magnetic material doped with a rare earth element. In certain embodiments, the trailing shield hot seed layer includes the rare earth element in an atomic percent content from about 2% to about 10% atomic percent. In certain embodiments, the trailing shield hot seed layer has an intrinsic damping from about 0.02 to about 0.2.

20 Claims, 10 Drawing Sheets

(56) References Cited

U.S. PATENT DOCUMENTS

| | | | |
|---|---|---|---|
| 9,355,654 B1 * | 5/2016 | Mallary | G11B 5/1278 |
| 9,355,657 B1 | 5/2016 | Aoyama et al. | |
| 9,437,268 B2 | 9/2016 | Wang et al. | |
| 9,466,319 B1 * | 10/2016 | Tang | G11B 5/1278 |
| 9,508,364 B1 * | 11/2016 | Tang | G11B 5/112 |
| 9,773,512 B2 | 9/2017 | Gubbins et al. | |
| 9,799,363 B2 * | 10/2017 | Chen | G11B 5/716 |
| 9,966,901 B2 | 5/2018 | Apalkov et al. | |
| 10,014,021 B1 * | 7/2018 | Liu | G11B 5/31 |
| 10,490,210 B1 * | 11/2019 | Liu | G11B 5/187 |
| 10,522,178 B1 * | 12/2019 | Liu | G11B 5/3109 |
| 10,580,440 B2 | 3/2020 | Sahoo et al. | |
| 2009/0257154 A1 | 10/2009 | Carey et al. | |
| 2011/0216447 A1 | 9/2011 | Li et al. | |
| 2013/0222949 A1 | 8/2013 | Braganca et al. | |
| 2013/0329317 A1 | 12/2013 | Yamada et al. | |
| 2014/0169146 A1 * | 6/2014 | Yin | G11B 5/1278 369/13.33 |
| 2014/0268404 A1 | 9/2014 | Horide et al. | |
| 2016/0180868 A1 * | 6/2016 | Gubbins | G11B 5/3116 360/125.12 |
| 2018/0144768 A1 * | 5/2018 | Liu | G11B 5/315 |
| 2018/0323371 A1 | 11/2018 | Liu et al. | |
| 2018/0330748 A1 * | 11/2018 | Liu | G11B 5/313 |
| 2019/0112722 A1 * | 4/2019 | Gong | C25D 5/18 |
| 2019/0147907 A1 | 5/2019 | Li et al. | |
| 2019/0251992 A1 * | 8/2019 | Ho | G11B 5/23 |

OTHER PUBLICATIONS

International Search Report and Written Opinion issued in corresponding International Patent Application No. PCT/US2020/023425, dated Sep. 16, 2020 (11 pages).

\* cited by examiner

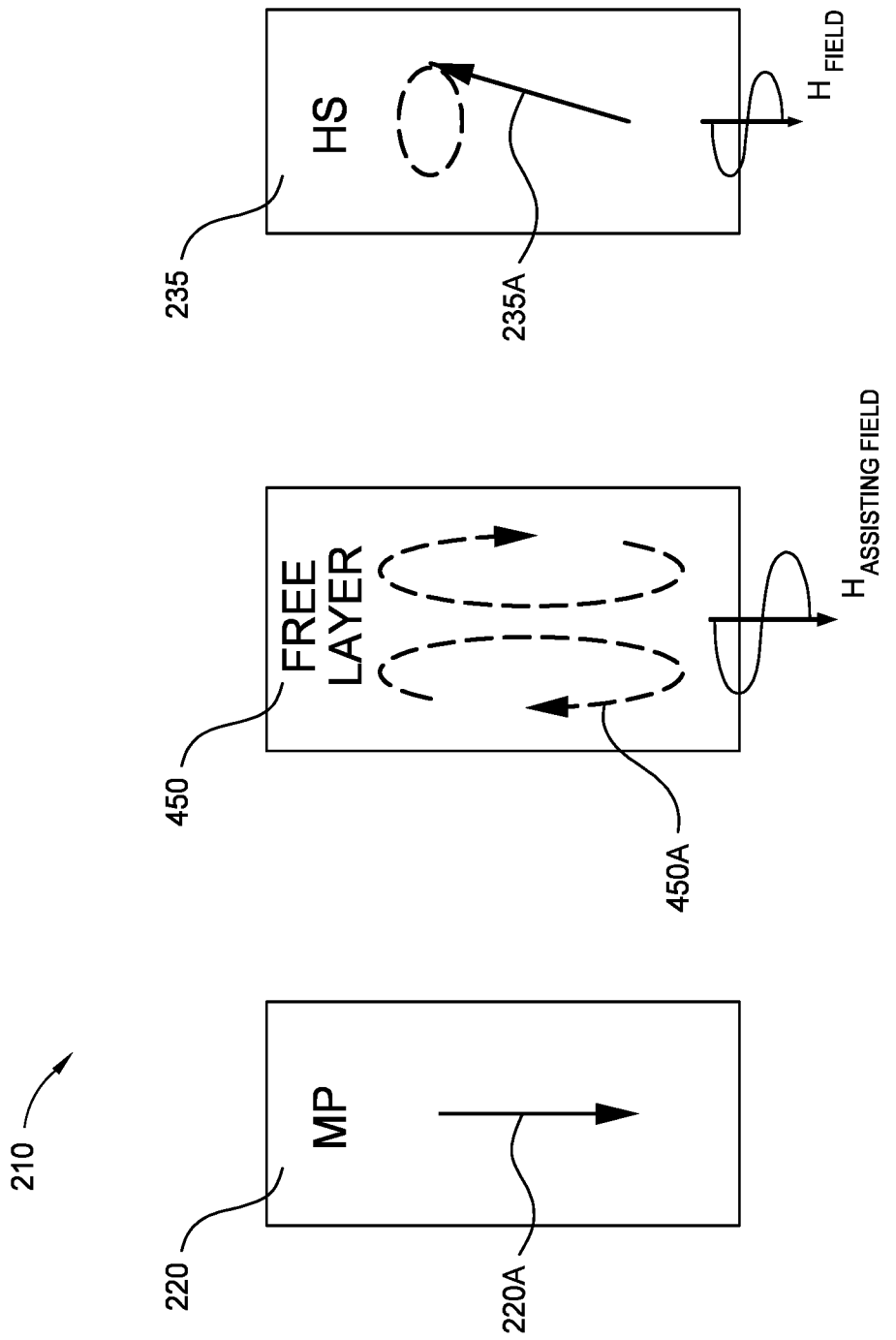

MAMR RECORDING HEAD WITH HIGH DAMPING TRAILING SHIELD SEED LAYER

BACKGROUND OF THE DISCLOSURE

Field of the Disclosure

Embodiments of the present disclosure generally relate to a microwave assisted magnetic recording (MAMR) write head with a spin torque oscillator (STO) device and a high damping trailing shield seed layer.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 1 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

Heat-assisted magnetic recording (HAMR) and microwave assisted magnetic recording (MAMR) are two types of energy-assisted recording technology to improve the recording density of a magnetic recording medium, such as a HDD. In MAMR, a spin torque oscillator (STO) device is located next to or near the write element in order to produce a high-frequency AC field, such as in a microwave frequency band. The high-frequency AC field reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology. However, a hard disk drive system with a MAMR write head may have an undesirable high level of bit-flipping of the magnetic medium. Therefore, there is a need in the art for an improved MAMR write heads.

SUMMARY OF THE DISCLOSURE

In certain embodiments, a microwave assisted magnetic recording (MAMR) write head includes a main pole and a trailing shield. A spin torque oscillator device is disposed between the main pole and the trailing shield. The spin torque oscillator device includes a free layer. A trailing shield hot seed layer is disposed between the spin torque oscillator device and the trailing shield. The trailing shield hot seed layer includes a magnetic material doped with a rare earth element.

In certain embodiments, a microwave assisted magnetic recording (MAMR) write head includes a main pole and a trailing shield. A spin torque oscillator device is disposed between the main pole and the trailing shield. The spin torque oscillator device includes a free layer. A trailing shield hot seed layer is disposed between the spin torque oscillator device and the trailing shield. The trailing shield hot seed layer includes a magnetic material doped with a rare earth element. The trailing shield hot seed layer includes the rare earth element in an atomic percent content from about 2% to about 10% atomic percent.

In certain embodiments, a microwave assisted magnetic recording (MAMR) write head includes a main pole and a trailing shield. A spin torque oscillator device is disposed between the main pole and the trailing shield. The spin torque oscillator device includes a free layer. A trailing shield hot seed layer is disposed between the spin torque oscillator device and the trailing shield. The trailing shield hot seed layer includes a magnetic material doped with a rare earth element. In certain embodiments, the trailing shield hot seed layer has an intrinsic damping from about 0.02 to about 0.2.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a schematic diagram of a MAMR writer head 210 of FIGS. 4A-D.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The terms "over," "under," "between," "on", and other similar terms as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. The relative position of the terms does not define or limit the layers to a vector space orientation of the layers.

The term "comprises/comprising" includes the subset meaning of "consists/consisting essentially of" and includes the subset meaning of "consists/consisting of."

Certain embodiments comprise a spin torque oscillator (STO) device for a microwave assisted magnetic recording (MAMR) write head disposed in a trailing shield gap between a main pole and a trailing shield (TS). The TS includes a high damping TS hot seed layer. The free layer of the STO device of the MAMR head oscillates during writing to provide an assistive AC field. However, the free layer may also cause oscillations of the magnetization direction with other components of the MAMR write head. These oscillations may generate additional AC fields which may cause increased bit flipping at the magnetic medium at areas proximate the MAMR recording point and/or diminish the assisting AC field at the MAMR recording point. A lower magnetic moment (Ms) and high damping in the TS hot seed layer reduces an AC field proximate the TS hot seed layer and reducing bit flipping in comparison to a low damping TS hot seed layer.

Figure 1:
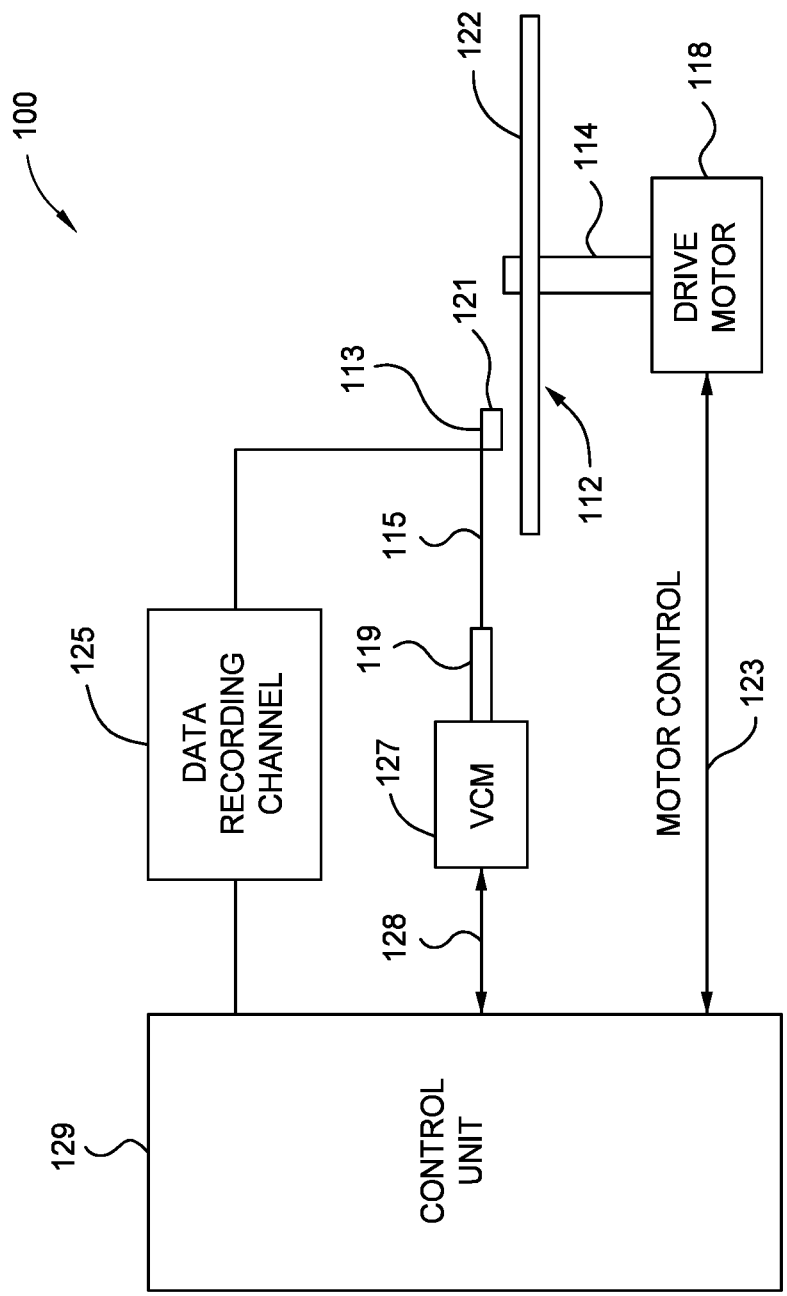
FIG. 1 is a schematic illustration of certain embodiments of a magnetic media drive including a write head.

FIG. 1 is a schematic illustration of certain embodiments of a magnetic media drive including a magnetic write head, such as a MAMR head. Such magnetic media drive may be a single drive/device or comprise multiple drives/devices. For the ease of illustration, a single disk drive 100 is shown according to one embodiment. The disk drive 100 includes at least one rotatable magnetic disk 112 supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a MAMR head including a STO device. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
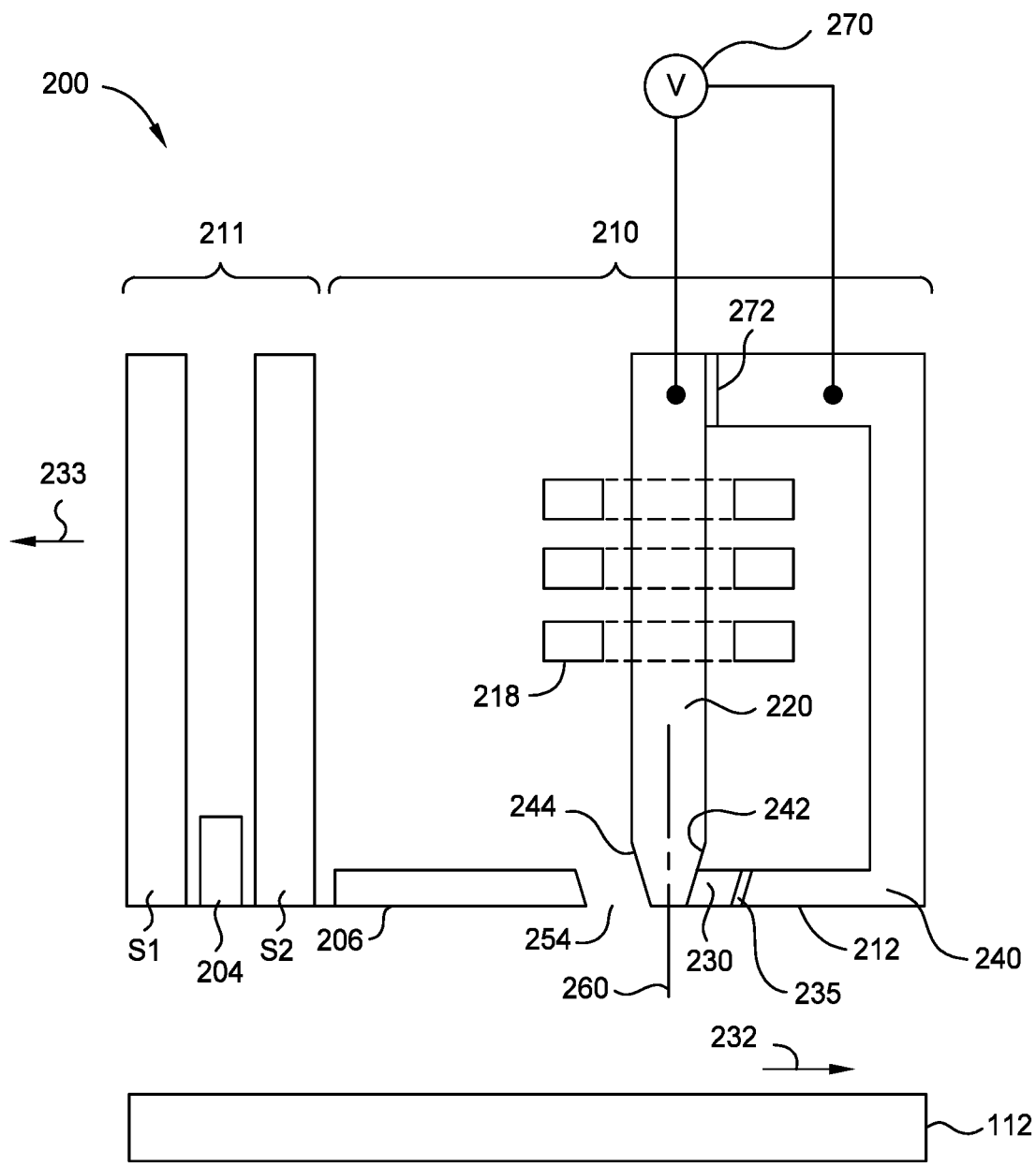
FIG. 2 is a schematic illustration of certain embodiments of a cross sectional side view of a head assembly facing a magnetic disk.

FIG. 2 is a schematic illustration of certain embodiments of a cross sectional side view of a head assembly 200 facing the magnetic disk 112 or other magnetic storage medium. The head assembly 200 may correspond to the head assembly 121 described in FIG. 1. The head assembly 200 includes a media facing surface (MFS) 212 facing the disk 112. As shown in FIG. 2, the magnetic disk 112 relatively moves in the direction indicated by the arrow 232 and the head assembly 200 relatively moves in the direction indicated by the arrow 233.

In some embodiments, the head assembly 200 includes a magnetic read head 211. The magnetic read head 211 may include a sensing element 204 disposed between shields S1 and S2. In certain embodiments, the sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the magnetic disk 112, such as perpendicular recorded bits or longitudinal recorded bits, are detectable by the sensing element 204 as the recorded bits.

The head assembly 200 includes a MAMR write head 210. In certain embodiments, the MAMR write head 210 includes a main pole 220, a leading shield 206, a TS 240, and a spin torque oscillator (STO) device 230 disposed between the main pole 220 and the TS 240. The main pole 220 serves as a first electrode and has a front portion at the MFS.

The main pole 220 comprises a magnetic material, such as CoFe, CoFeNi, or FeNi, other suitable magnetic materials. In certain embodiments, the main pole 220 comprises small grains of magnetic materials in a random texture, such as body-centered cubic (BCC) materials formed in a random texture. For example, a random texture of the main pole 220 may be formed by electrodeposition. The MAMR write head 210 includes a coil 218 around the main pole 220 that excites the main pole 220 producing a writing magnetic field structures for affecting a magnetic medium of the rotatable magnetic disk 112. The coil 218 may be a helical structure or one or more sets of pancake structures.

In certain embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown) in which the trailing side and the leading side are substantially parallel.

The TS 240 comprises a magnetic material, such as FeNi, or other suitable magnetic materials, serving as a second electrode and return pole for the main pole 220. The leading shield 206 may provide electromagnetic shielding and is separated from the main pole 220 by a leading gap 254.

The STO device 230 is positioned proximate the main pole 220 and reduces the coercive force of the magnetic medium, so that smaller writing fields can be used to record data. An electron current is applied to STO device 230 from a power source 270 to produce a microwave field. The electron current may be a direct current (DC) waveforms, pulsed DC waveforms, and/or pulsed current waveforms going to positive and negative voltages, or other suitable waveforms.

In certain embodiments, the STO device 230 may be electrically coupled to the main pole 220 and the TS 240 in which the main pole 220 and the TS are separated by an insulating layer 272. The power source 270 may provide electron current to the STO device 230 through the main pole 220 and the TS 240. For direct current or pulsed current, the power source 270 may flow electron current from the main pole 220 through the STO device 230 to the TS 240 or may flow electron current from the TS 240 through the STO device 230 to the main pole 220 depending on the orientation of the STO device 230. In other embodiments, the STO device 230 may be coupled to electrical leads providing an electron current other than from the main pole and/or the TS.

Figure 3:
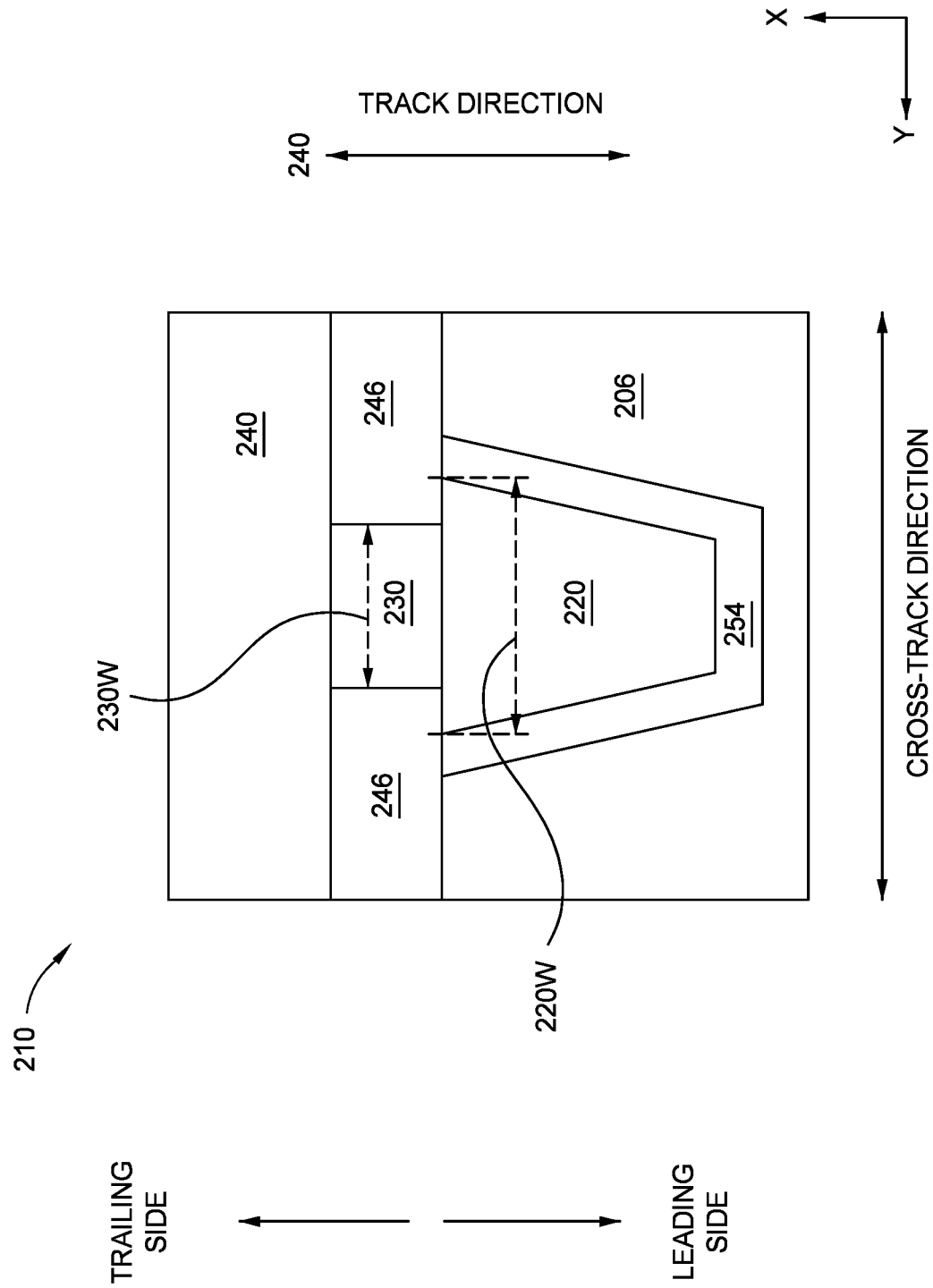
FIG. 3 is a schematic illustration of certain embodiments of a plan view of a media facing surface of a MAMR head of FIG. 2 with a spin torque oscillator (STO) device between a main pole and a trailing shield in a track direction.

FIG. 3 is a schematic illustration of certain embodiments of a plan view of a media facing surface of the MAMR write head 210 of FIG. 2 with a STO device 230 between a main pole 220 and a TS 240 in the track direction. The main pole 220 of the write head 210 may be any suitable shape (i.e., trapezoidal, triangular, etc.) and suitable dimensions. The STO device 230 may be formed to any suitable shape, any suitable dimension, and any suitable position between the main pole 220 and the TS 240. For example, the width 230W of the STO device 230 may be greater than, equal to, or less than the width 220W of the main pole 220 at the interface with the STO device 230.

The leading shield 206 may be positioned on one or more sides of the main pole 220 with the leading gap 254 therebetween. A side gap 246 may be positioned on the sides of the STO device 230. The side gap 246 may comprise an insulating material.

The track direction is label as the x-coordinate and the cross-track direction is labeled as the y-coordinate. The perpendicular direction to the media facing surface would be the z-coordinate into/out of the X-Y plane.

FIGS. 4A-4D are side cross-sectional views of various embodiments of a STO device 230 of a MAMR write head 210 configured to oscillate due to spin-transfer torque. The MAMR write head 210 can be the MAMR write head of FIG. 2 or other suitable MAMR write heads. The STO device 230 is positioned proximate the main pole 220 and reduces the coercive force of the magnetic disk 112 or other magnetic storage medium magnetic medium, so that smaller writing fields ($H_{writing\ Field}$) can be used to record data. A bias current ($I_{STO}$) applied to the STO device 230 from the power source 270 of FIG. 2 produces an assisting AC field ($H_{Assisting\ Field}$), such as a microwave field. The assisting AC field is formed by oscillation of the magnetization of a field generation layer (FGL) or free layer 450 of the STO device 230. The chirality or rotation direction of the free layer 450 switches in response to the switch in direction of the writing field of the main pole 220.

Figure 4A:
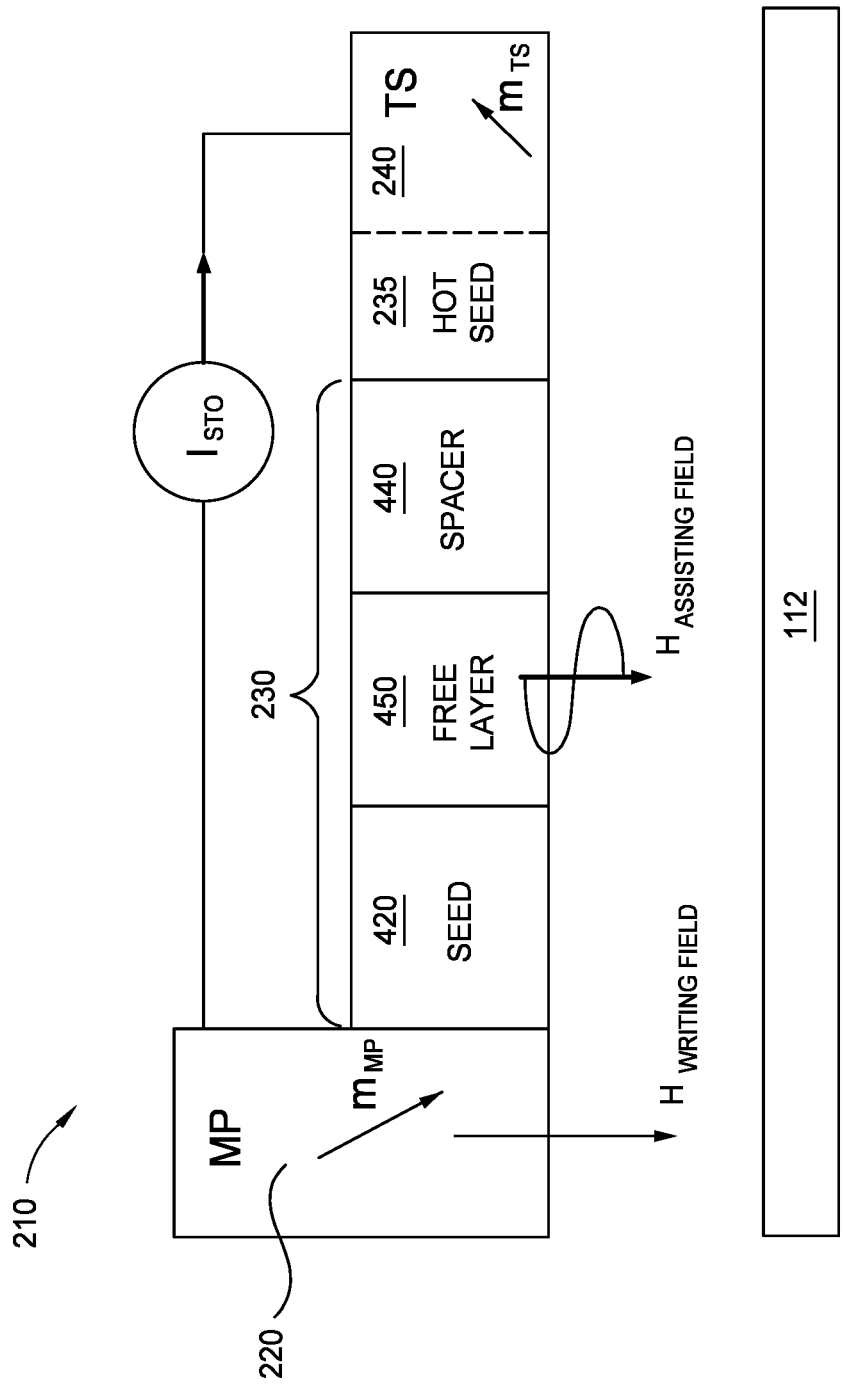
FIGS. 4A-4D are side cross-sectional views of various embodiments of a STO device of a MAMR write head configured to oscillate due to spin-transfer torque.

In certain embodiments, as shown in FIG. 4A, the STO device 230 includes a seed layer 420 over or on the main pole 220, a free layer 450 over or on the seed layer 420, a spacer layer 440 over or on the free layer 450, a high damping TS hot seed layer 235 over or on the spacer layer 440, and a TS 240 over the high damping TS hot seed layer 235. Electron current flow from the main pole 220 through the STO device 230 to the TS 240 causes polarized electrons to be reflected from the TS 240 back towards the free layer 450. The reflected polarized electrons creates spin transfer torque on the magnetization of the free layer 450 and causes the magnetization of the free layer 450 to oscillate.

Figure 4B:
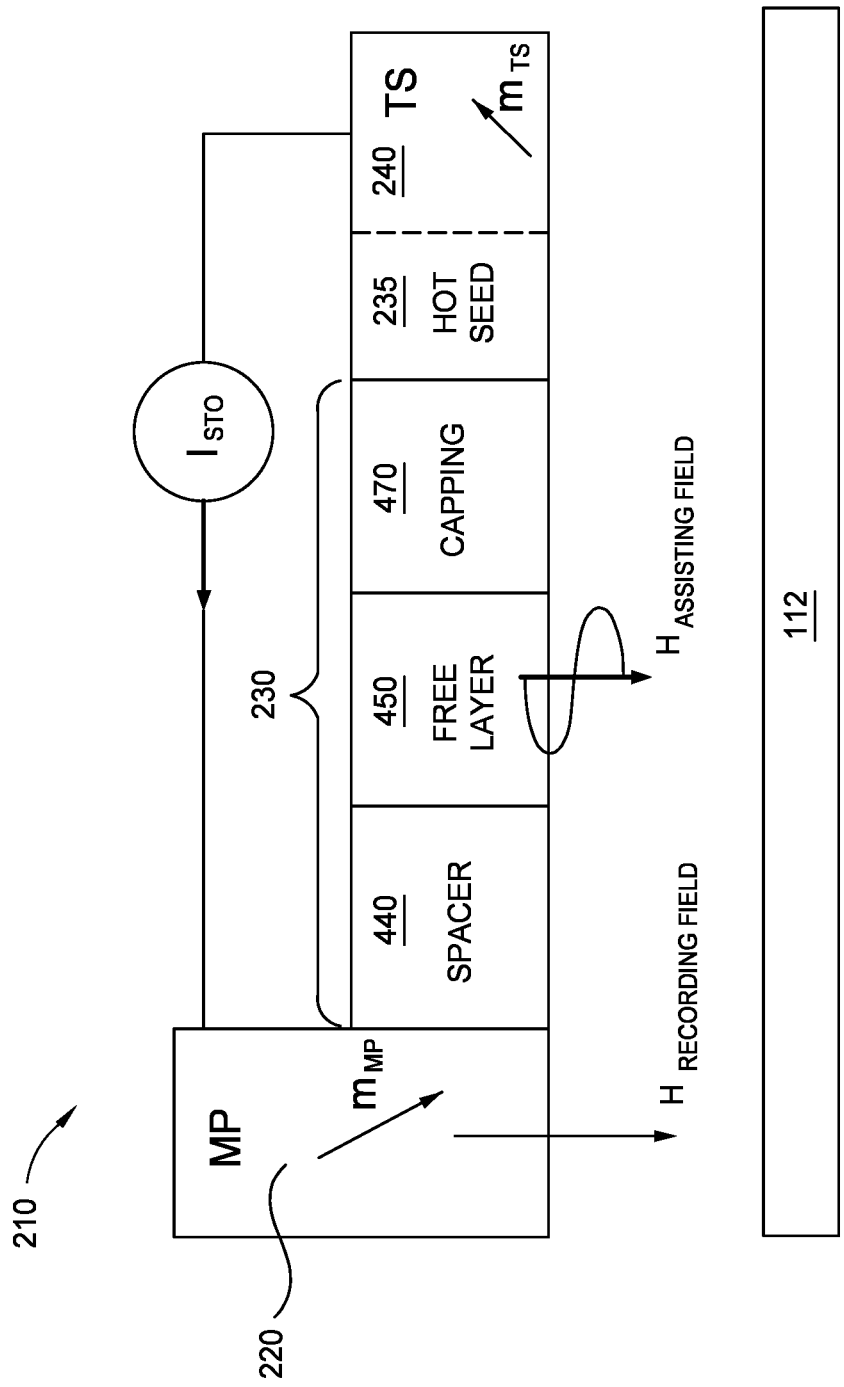

In certain embodiments, as shown in FIG. 4B, the STO device 230 includes a spacer layer 440 over or on the main pole 220, a free layer 450 over or on the spacer layer 440, a capping layer 470 over or on the free layer 450, a high damping TS hot seed layer 235 over or on the capping layer 470, and a TS 240 over the TS hot seed layer 235. Electron current flow from the TS 240 through the STO device 230 to the main pole 220 causes polarized electrons to be reflected from the main pole 220 back towards the free layer 450. The reflected polarized electrons creates spin transfer torque on the magnetization of the free layer 450 and causes the magnetization of the free layer 450 to oscillate.

Figure 4C:
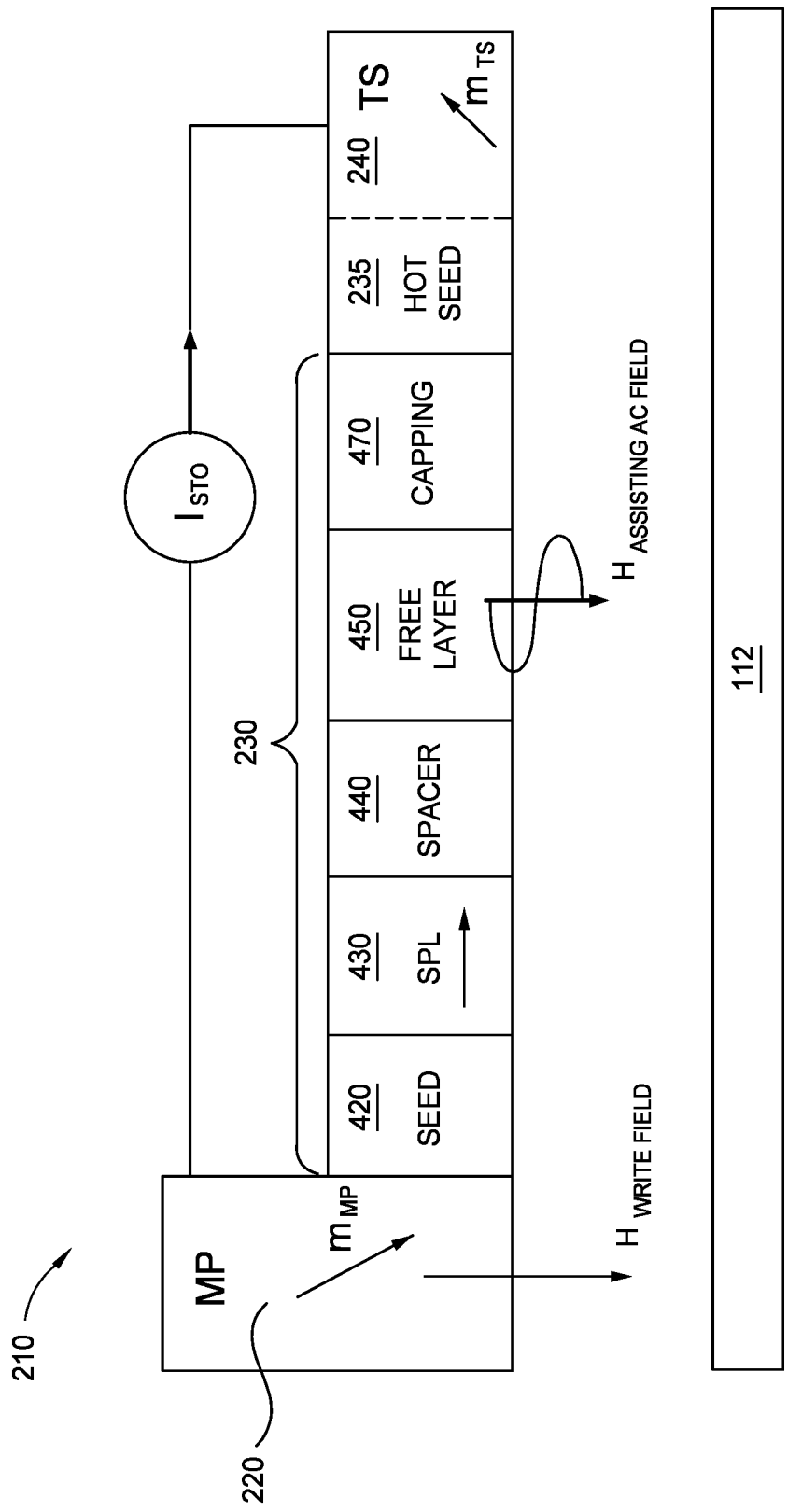

In certain embodiments, as shown in FIG. 4C, the STO device 230 includes a seed layer 420 over or on the main pole 220, a spin polarization layer (SPL) 430 over or on the seed layer 420, a spacer layer 440 over or on the SPL 430, a free layer 450 over or on the spacer layer 440, a capping layer 470 over or on the free layer 450, a high damping TS hot seed layer 235 over or on the capping layer 470, and a TS 240 over or on the high damping TS hot seed layer 235. Electron current flow from the main pole 220 through the STO device 230 to the TS 240 imparts spin polarization of the electrons from the SPL 430. The polarized electrons from the SPL 430 creates spin transfer torque on the magnetization of the free layer 450 and causes the magnetization of the free layer 450 to oscillate. The TS 240 may reflect polarized electrons towards the free layer 450 to increase spin-transfer torque on the free layer 450.

Figure 4D:
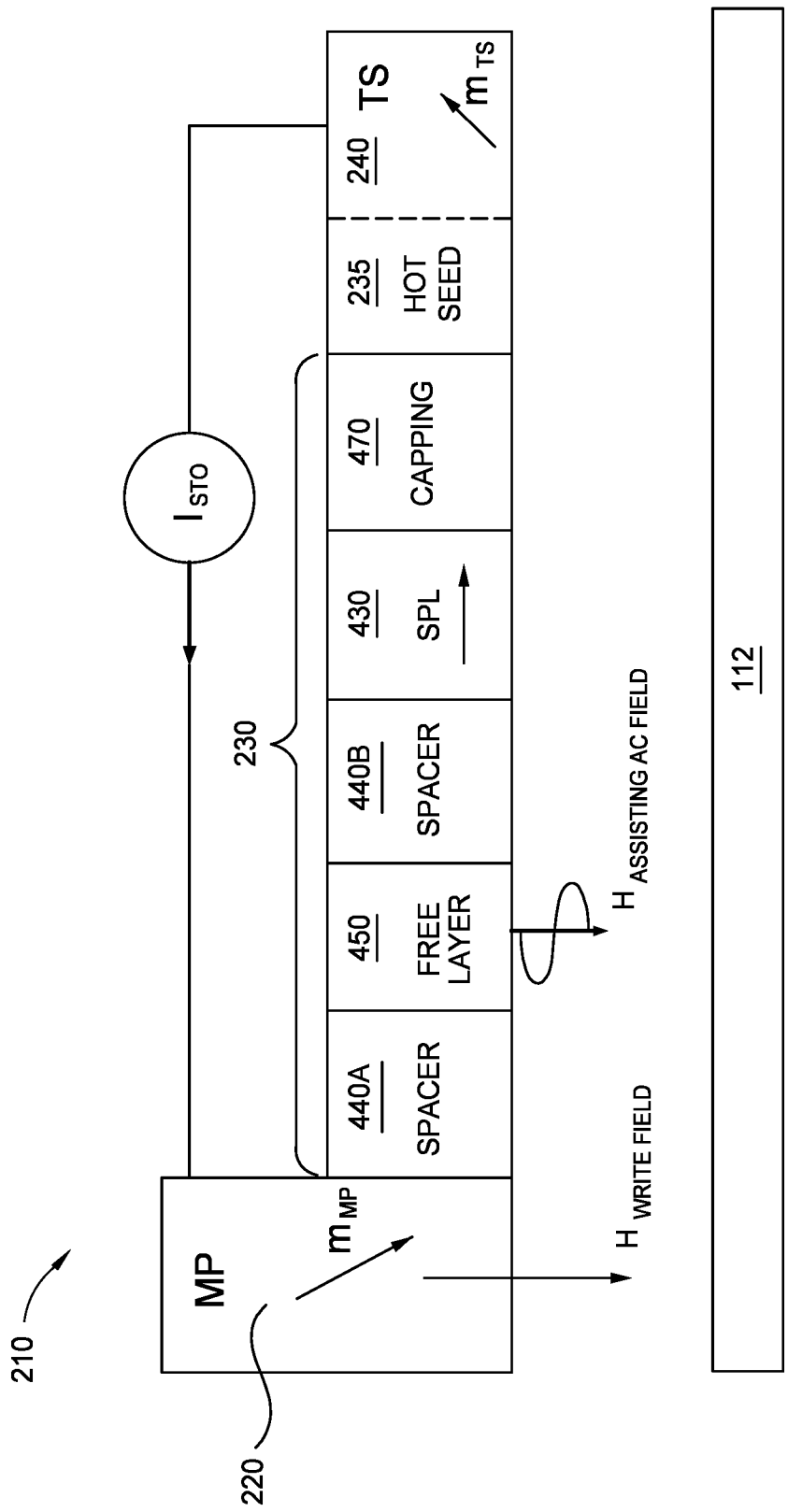

In certain embodiments, as shown in FIG. 4D, the STO device 230 includes a first spacer layer 440A over or on the main pole 220, a free layer 450 over or on the first spacer layer 440, a second spacer layer 440B over or on the free layer 450, a spin polarization layer (SPL) 430 over or on the second spacer layer 440B, a capping layer 470 over or on the SPL 430, a high damping TS hot seed layer 235 over or on the capping layer 470, and a TS 240 over or on the high damping TS hot seed layer 235. Electron current flow from the TS 240 through the STO device 230 to the main pole 220 imparts spin polarization of the electrons from the SPL 430. The polarized electrons from the SPL 430 creates spin transfer torque on the magnetization of the free layer 450 and causes the magnetization of the free layer 450 to oscillate. The main pole 220 may reflect polarized electrons towards the free layer 450 to increase spin-transfer torque on the free layer 450.

In certain embodiments, the free layer 450 of the STO device 230 of FIGS. 4A-D comprises one or more magnetic alloy layers comprising Fe, Co, FeCo, NiFe, CoFeAl, CoFeGe, CoMnGe, CoFeSi, CoMnSi, and other magnetic materials. For example, in certain embodiments, the free layer 450 comprises a ferromagnetic material having a high moment and high spin polarization, such as FeCo and FeCo alloys.

In certain embodiments, the spacer layer(s) 440 of the STO device 230 of FIGS. 4A-D includes one or more non-magnetic conductive materials, such as Au, Ag, Al, Cu, AgSn, NiAl, other non-magnetic conductive materials, alloys thereof, or multiple layers thereof. The spacer layer 440 may be made of a material having a high spin transmissivity for spin torque transfer on the free layer 450.

In certain embodiments, the SPL 430 of the STO device 230 of FIG. 4B or 4D comprises NiFe, CoFe, CoFeNi, CoMnGe, NiCo, NiFeCu, CoFeMnGe, CoMnSi, CoFeSi, other soft or hard ferromagnetic materials, other Heusler alloys, other suitable magnetic layers, or multiple layers thereof. The SPL 430 can comprise a material having magnetic anisotropy oriented in any general direction, such as perpendicular, angled, or longitudinal, to the plane of the magnetic disk 112 or other magnetic recording medium.

In certain embodiments, the seed layer 420 of the STO device 230 of FIG. 4A or 4C comprises ruthenium, copper, tantalum, other non-magnetic materials, alloys thereof, or multiple layers thereof. In certain embodiments, the seed layer 420 resets or provides a texture break for the growth of the SPL 430 with low structural defects over the seed layer 420. Low structural defects of the SPL 430 results in the SPL 430 with more magnetic homogeneity, lower critical current for reversal of the SPL 430, and better yield in the formation of the SPL 430. For example, a seed layer comprising tantalum over copper provides a nano-crystalline structure formed over the random texture of the main pole 220. The nano-crystalline structure provides a smooth surface for formation of structured layers or crystalline layers thereover with low structure/crystal defects. In certain embodiments, the seed layer 420 provides a surface for good growth of structured and/or crystalline layers such, such as face centered cubic (FCC) metal alloys, body center cubic (BCC) metal alloys, and ordered phase alloys. For example, a seed layer 420 comprising ruthenium has a hexagonal close packed structure. The hexagonal close packed (HCP) structure provides a good template surface for growth or interfacing with a FCC layer, a BCC layer, or a Heusler layer with low structural defects. In certain embodiments, the seed layer 420 removes spin polarization of electrons from the main pole 220.

In certain embodiments, a capping layer 470 of the STO device 230 of FIG. 4B or 4D comprises one or more layers of non-magnetic conductive materials, metals or metal alloys of Ru, Ir, Ta, Ti, and other non-magnetic metals. The capping layer 470 may protects the STO device 230 during formation of the STO device and formation of the MAMR write head 210, such as during deposition, annealing, patterning, cleaning, etc.

In certain embodiments, a notched structure may be formed over the TS hot seed layer 235 or the TS hot seed layer 235 and the TS 240 may be formed into a pedestal structure (collectively referred to as a notched trailing shield). A notched trailing shield can reflect polarized electrons towards the free layer 450 to increase spin-transfer torque on the free layer 450, such as in the STO devices of FIG. 4A and FIG. 4C.

The high damping TS hot seed layer 235 of the STO device 230 of FIGS. 4A-D comprises a magnetic material doped with one or more rare earth metals. Examples of magnetic materials include CoFe and CoFe alloys. Rare earth metals include holmium (Ho), dysprosium (Dy), terbium (Tb), samarium (Sm), other rare earth metals, or combinations thereof. One particular example of a high damping TS hot seed layer 235 is CoFeHo.

The damping in the TS hot seed layer is impacted by certain magnetic materials in combination with certain doping materials. In certain embodiments, the TS hot seed layer 235 comprises an atomic percent content of a rare earth metal from about 2% to about 10%. A high damping TS hot seed layer 235 having a rare earth metal content of greater than 10% may be undesirable since the rare earth metal content excessively reduces the magnetic moment (Bs) of the TS hot seed layer, reducing the write field gradient and/or causes the TS hot seed layer to be susceptible to corrosion during manufacture and/or during operation. A high damping TS hot seed layer 235 having a rare earth metal content of less than 2% may be undesirable since a certain damping may not be achieved to reduce oscillation of the TS hot seed layer caused by oscillation of the free layer 450.

In certain embodiments, the TS hot seed layer 235 has an intrinsic damping from about 0.02 to about 0.2. The intrinsic damping in a magnetic system (a thin film, multilayer stack, or structure device) is a physical property of the magnetic system. The damping in the TS hot seed layer of a MAMR write head is determined by isolating the TS hot seed layer or by creating a like sample of the TS hot seed layer and measuring the intrinsic damping in the isolated TS hot seed layer or like sample of the TS hot seed layer by ferromagnetic resonance (FMR) measurements at 20° C. utilizing a PhaseFMR tool available from NanOsc Instruments AB located in Kista, Sweden. Intrinsic damping, also called Gilbert damping, is a unitless parameter determined from the Landau-Lifschitz-Gilbert equation. An intrinsic damping of greater than 0.2 may be undesirable since the magnetic moment (Bs) of the TS hot seed layer may be too low and may reduce the write field gradient. An intrinsic damping of less than 0.02 may be undesirable since a certain damping may not be achieved to reduce oscillation of the TS hot seed layer caused by oscillation of the free layer 450.

FIG. 5 is a schematic diagram of a MAMR writer head, such as the MAMR writer head 210 of FIGS. 4A-D. The main pole 220 is energized in a magnetization direction 220A by the write coil 218 which causes the TS hot seed layer 235 to be in a magnetization direction 235A. Current applied to the STO device 230 causes the magnetization direction 450A of the free layer 450 to oscillate. Oscillation of the free layer 450 causes oscillation of the TS hot seed layer 235. The oscillation of the hot seed layer generates an additional AC field proximate the hot seed layer. When the TS hot seed layer comprises a low damping material, the additional AC field proximate the TS hot seed layer may be relatively large, such as greater than 400 Oe in a perpendicular direction to the media facing surface, which may inadvertently cause bit flipping in the magnetic medium, such as inadvertent writing to or inadvertent erasure of the magnetic medium. When TS hot seed layer 235 comprises a high damping material, the additional AC field proximate the TS hot seed layer is reduced, such as to 400 Oe or less, to about 200 Oe or less, in a perpendicular direction. This reduces bit flipping in the magnetic medium, such as reducing inadvertent writing to and/or inadvertent erasure of the magnetic medium.

By minimizing amplitude of oscillations of a TS hot seed layer, the contribution of an AC field from the hot seed layer can be reduced. Doping the TS hot seed layer with a rare earth metal reduces the amplitude of oscillations of the TS hot seed layer by lowering the magnetic moment (Ms) of the TS hot seed layer and by providing high damping in the TS hot seed layer.

The certain embodiments, a microwave assisted magnetic recording (MAMR) write head includes a main pole and a trailing shield. A spin torque oscillator device is disposed between the main pole and the trailing shield. The spin torque oscillator device includes a free layer. A trailing shield hot seed layer is disposed between the spin torque oscillator device and the trailing shield. The trailing shield hot seed layer includes a magnetic material doped with a rare earth element. In certain embodiments, the trailing shield hot seed layer includes the rare earth element in an atomic percent content from about 2% to about 10% atomic percent. In certain embodiments, the trailing shield hot seed layer has an intrinsic damping from about 0.02 to about 0.2.

EXAMPLES

Figure 6:
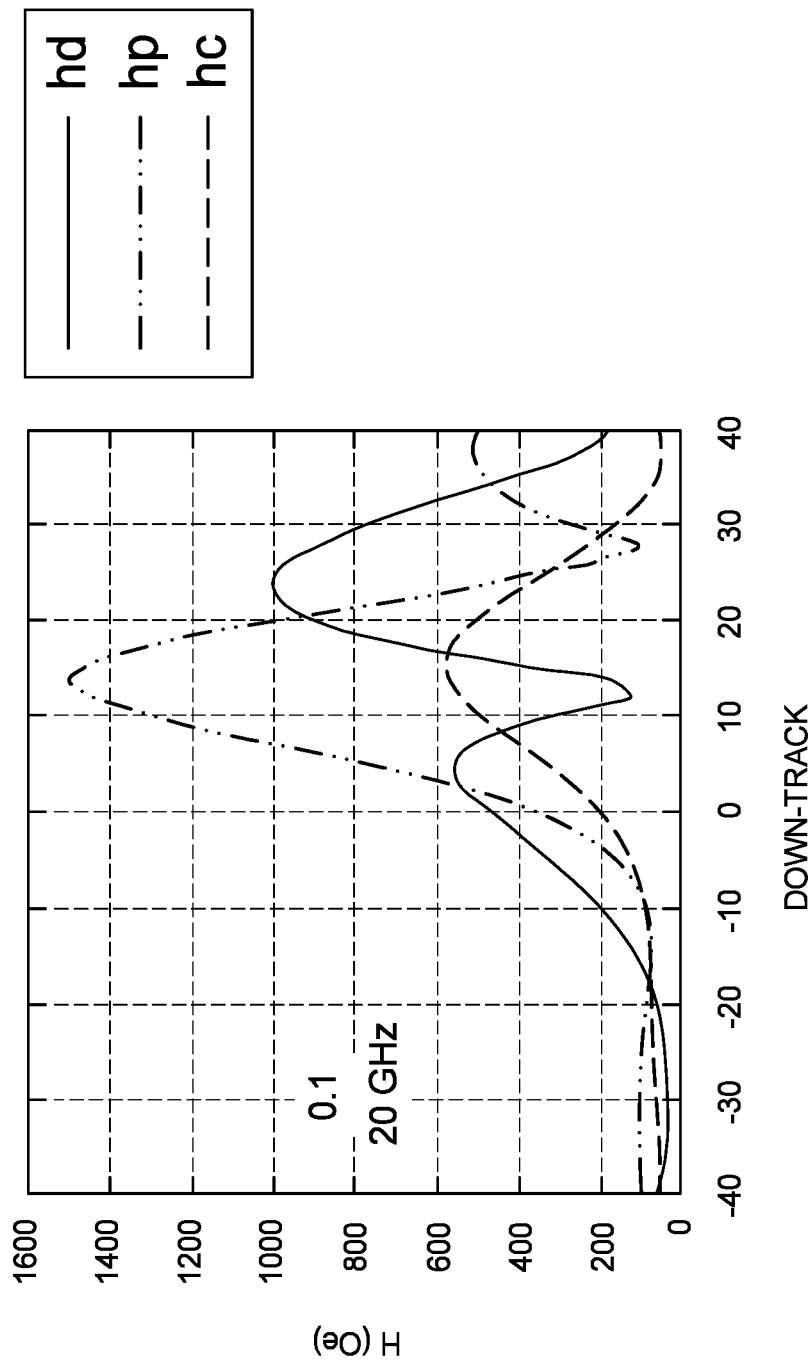
FIG. 6 is a graph of the amplitudes of the AC fields of an STO device with a TS hot seed layer without high damping.

FIG. 6 is a graph of the amplitudes of the AC fields of an STO device with a TS hot seed layer without high damping along a down-track position starting from the main pole area (−40) to the TS hot seed area (+40). The amplitudes of the AC fields were measured by the magnetic field strength in a down track field (hd), in a cross track field (hc), and in a perpendicular field to a media facing surface (hp). Measurements were conducted at a frequency of 20 GHz. The TS hot seed without high damping comprised CoFe with an intrinsic damping ($\alpha_{int}$) of 0.01. The STO device had an AC field with a perpendicular component of about 500 Oe in the TS hot seed area.

Figure 7:
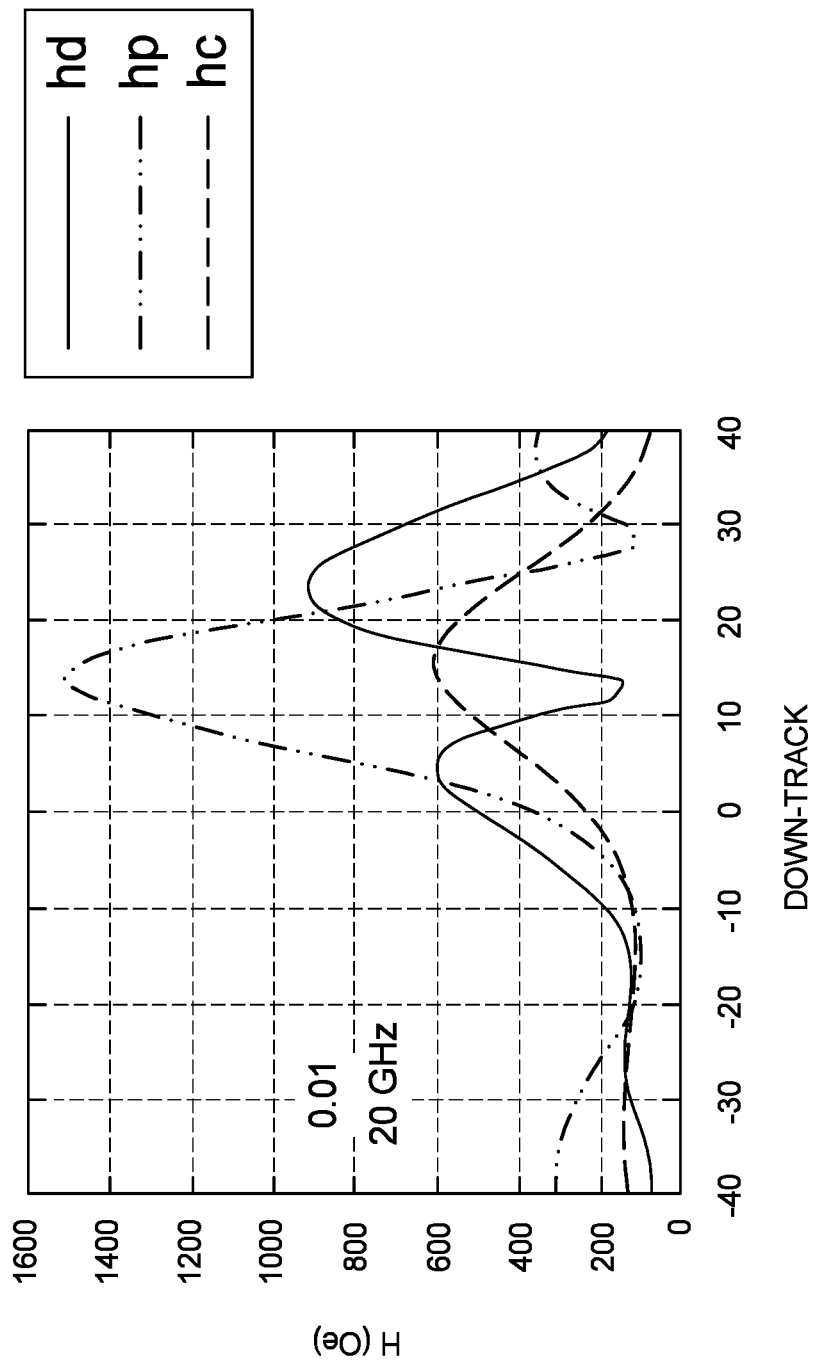
FIG. 7 is a graph of the amplitudes of the AC fields of an STO device with a TS hot seed layer with high damping.

FIG. 7 is a graph of the amplitudes of the AC fields of an STO device with a TS hot seed layer with high damping along a down-track position starting from the main pole area (−40) to the TS hot seed area (+40). The amplitudes of the AC fields were measured by the magnetic field strength in a down track field (hd), in a cross track field (hc), and in a perpendicular field to a media facing surface (hp). Measurements were conducted at a frequency of 20 GHz. The TS hot seed with high damping comprised CoFeHo with an intrinsic damping ($\alpha_{int}$) of 0.10. The STO device had an AC field with a perpendicular component of about 375 Oe in the TS hot seed area.

While the foregoing is directed to embodiments of the present disclosure, other and further embodiments of the disclosure may be devised without departing from the basic scope thereof, and the scope thereof is determined by the claims that follow.

What is claimed is:

1. A microwave assisted magnetic recording (MAMR) write head, comprising:
a main pole and a trailing shield;
a spin torque oscillator device disposed between the main pole and the trailing shield, the spin torque oscillator device comprising a free layer; and
a trailing shield hot seed layer disposed between the spin torque oscillator device and the trailing shield, the trailing shield hot seed layer comprising a magnetic material doped with a rare earth element.

2. The MAMR write head of claim 1, wherein the rare earth element is selected from a group consisting of holmium (Ho), dysprosium (Dy), terbium (Tb), and samarium (Sm).

3. The MAMR write head of claim 1, wherein the rare earth element is holmium.

4. The MAMR write head of claim 1, wherein the magnetic material comprises CoFe or CoFe alloys.

5. The MAMR write head of claim 1, wherein the trailing hot seed layer is configured to produce an AC field of about 400 Oe or less in a perpendicular direction to a media facing surface of the trailing hot seed layer.

6. A magnetic media drive comprising the MAMR write head of claim 1.

7. A microwave assisted magnetic recording (MAMR) write head, comprising:
a main pole and a trailing shield;
a spin torque oscillator device disposed between the main pole and the trailing shield, the spin torque oscillator device comprising a free layer; and
a trailing shield hot seed layer disposed between the spin torque oscillator device and the trailing shield, the trailing shield hot seed layer comprising a magnetic material doped with a rare earth element, the trailing shield hot seed layer comprising the rare earth element in an atomic percent content from about 2% to about 10% atomic percent.

8. The MAMR write head of claim 7, wherein the rare earth element is holmium.

9. The MAMR write head of claim 7, wherein the magnetic material comprises CoFe or CoFe alloys.

10. The MAMR write head of claim 7, wherein the trailing hot seed layer is configured to produce an AC field of about 400 Oe or less in a perpendicular direction to a media facing surface of the trailing hot seed layer.

11. The MAMR write head of claim 7, wherein the trailing hot seed layer is configured to produce an AC field of about 200 Oe or less in a perpendicular direction to a media facing surface of the trailing hot seed layer.

12. The MAMR write head of claim 7, wherein the spin torque oscillator device is configured to oscillate a magnetization direction of the free layer due to spin transfer torque from polarized electrons directed towards the free layer.

13. The MAMR write head of claim 7, wherein the spin torque oscillator device further comprises a spin polarization layer configured to direct polarized electrons towards the free layer to oscillate a magnetization direction of the free layer due to spin transfer torque.

14. A magnetic media drive comprising the MAMR write head of claim 7.

15. A microwave assisted magnetic recording (MAMR) write head, comprising:
a main pole and a trailing shield;
a spin torque oscillator device disposed between the main pole and the trailing shield, the spin torque oscillator device comprising a free layer; and
a high damping trailing shield hot seed layer disposed between the spin torque oscillator device and the trailing shield, the trailing shield hot seed layer having intrinsic damping from about 0.02 to about 0.2.

16. The MAMR write head of claim 15, wherein the trailing hot seed layer is configured to produce an AC field of about 400 Oe or less in a perpendicular direction to a media facing surface of the trailing hot seed layer.

17. The MAMR write head of claim 15, wherein the trailing hot seed layer is configured to produce an AC field of about 200 Oe or less in a perpendicular direction to a media facing surface of the trailing hot seed layer.

18. The MAMR write head of claim 15, wherein the spin torque oscillator device is configured to oscillate a magnetization direction of the free layer due to spin transfer torque from polarized electrons directed towards the free layer.

19. The MAMR write head of claim 15, wherein the spin torque oscillator device further comprises a spin polarization layer configured to direct polarized electrons towards the free layer to oscillate a magnetization direction of the free layer due to spin transfer torque.

20. A magnetic media drive comprising the MAMR write head of claim 15.

* * * * *